United States Patent [19]

Davidson et al.

[11] Patent Number: 4,932,050
[45] Date of Patent: Jun. 5, 1990

[54] PROXIMITY DETECTION FOR TELECOMMUNICATIONS FEATURES

[75] Inventors: Wayne A. Davidson, Winfield; Daniel H. Larson, Downers Grove, both of Ill.

[73] Assignee: AT&T Bell Laboratories, Murray Hill, N.J.

[21] Appl. No.: 374,115

[22] Filed: Jun. 30, 1989

[51] Int. Cl.⁵ .................................. H04M 3/54
[52] U.S. Cl. ............................. 379/211; 379/201; 379/210
[58] Field of Search .......... 379/201, 210, 211, 213, 379/214, 67, 88, 89, 38, 52

[56] References Cited

U.S. PATENT DOCUMENTS 4,275,385  6/1981  White ............................ 340/312
4,601,064  7/1986  Shipley ....................... 379/211 X
4,752,951  6/1988  Konneker ..................... 379/211

FOREIGN PATENT DOCUMENTS 0050151  3/1988  Japan ............................ 379/214
0187929  8/1988  Japan ............................ 379/210

Primary Examiner—James L. Dwyer
Attorney, Agent, or Firm—Ross T. Watland

[57] ABSTRACT

A switching system in which telecommunications features are improved by the use of the proximity status of a telephone station set user. The status is transmitted to the switching system over the same telephone line used for the station set. The proximity status information simply defines the presence or absence of a person to answer calls to the station set without identifying a particular person.

47 Claims, 9 Drawing Sheets

ANALOG TELEPHONE WORK AREA 160

ISDN TELEPHONE WORK AREA 170

MEMORY 115

| DIRECTORY NUMBER | ANALOG OR ISDN | BUSY/IDLE DATA | PROXIMITY OF PRIMARY USER | ENTITLED NUMBERS | FORWARD TO |
|---|---|---|---|---|---|
| DN1 | ANALOG | BUSY | IN WORK AREA | DN3, DN4 | DN17 |
| DN2 | ANALOG | IDLE | IN WORK AREA | DN1 TO DN50 | DN25 |
| DN3 | ANALOG | IDLE | OUT OF WORK AREA | NONE | DN25 |
| DN4, -CA1 -CA2 | ISDN | N/A BUSY IDLE | IN WORK AREA | DN6, DN8 (PASSWORD) | DN17 |
| DN5, -CA1 -CA2 | ISDN | N/A IDLE IDLE | OUT OF WORK AREA | DN9 | DN25 |
| DN6, -CA1 -CA2 | ISDN | N/A IDLE IDLE | PRIVATE | NONE | DN17 |
| DN7, -CA1 -CA2 | ISDN | N/A IDLE IDLE | "UNKNOWN" | DN2 | DN17 |
| DN8, -CA1 -CA2 | ISDN | N/A IDLE IDLE | "NULL" | N/A | N/A |
| ⋮ | | | | | |

FIG. 4

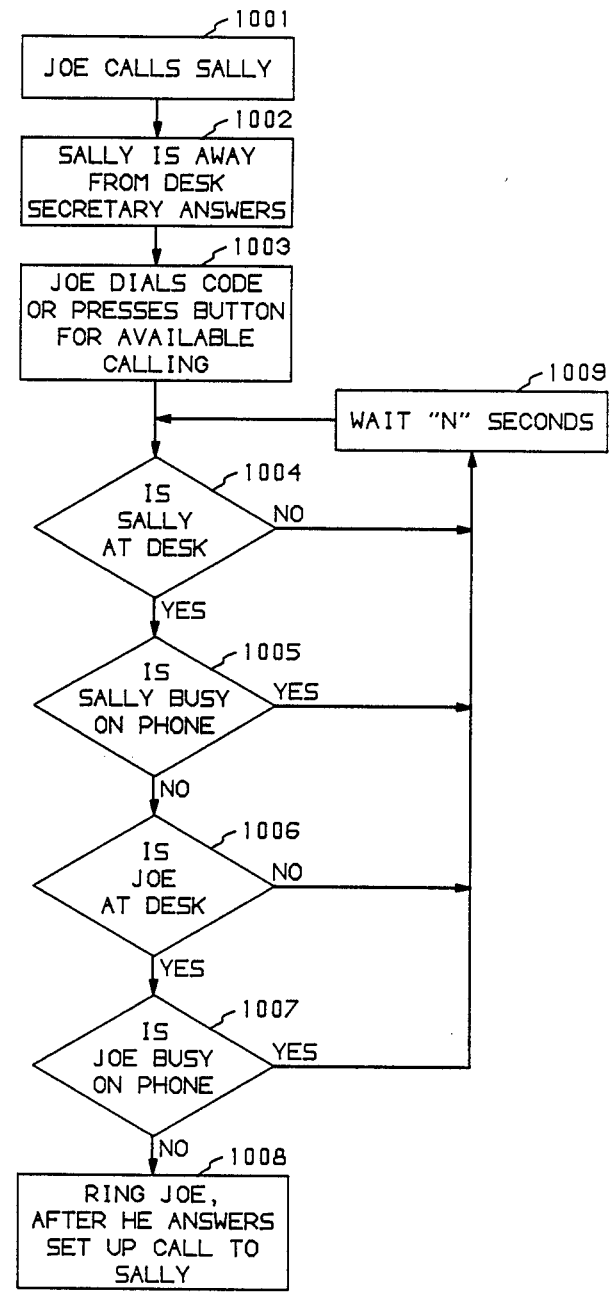

PROXIMITY DETECTION FOR TELECOMMUNICATIONS FEATURES

TECHNICAL FIELD

This invention relates to telecommunications.

BACKGROUND AND PROBLEM

A multitude of customized services are presently available for serving telephone customer needs. Illustrative of such a service is a call forwarding feature which enables a customer to control the forwarding of her incoming calls to a designated telephone station instead of her regular telephone station. Typically, the service is activated by the customer dialing a prearranged code plus the directory number of the telephone station designated to receive the forwarded calls. In many situations, the call forwarding service is activated before the customer leaves the home or business environment of her regular telephone station. The service is usually deactivated when the customer returns to the environment of the regular telephone station. Again, the deactivation is generally controlled by the customer dialing another prearranged code.

While such a service has enjoyed widespread commercial success, a common problem facing the art is that a customer often does not remember to deactivate the service when she returns to her home or business environment. Obviously, such a situation results, for example, in the undesired forwarding of calls, wasted time, customer frustration and many times, unnecessary other calls to receive information about who called and finally to return the missed calls.

One known advanced communication arrangement, disclosed in U.S. Pat. No. 4,275,385 issued to L. L. White on June 23, 1981, is based on an infrared personnel locator system using a periodic unique infrared identification code emitted from a battery-powered transmitter unit to identify the person carrying the transmitter unit to an overhead infrared receiver as the person enters the receiver's monitoring zone. The transmitter unit identification code together with the receiver identification code is communicated to a common control unit which displays the location of all of the transmitter units. For paging, the system provides alerting units, e.g., telephone station sets, which are selectively operated in the zone closest to the person being paged. As disclosed in the above-referenced U.S. Pat. No. 4,275,385, the common control unit may be implemented as part of the control unit of a telephone switching network and call forwarding to the nearest telephone station set may be effected based on a person's location. Although the advanced services afforded by this known arrangement are very useful, the cost and complexity associated with providing an additional wiring arrangement, separate from the telephone wiring, to connect the infrared receivers to the common control unit, and monitoring the location of particular individuals based on unique identification codes, are undesirable and unnecessary in many applications.

SOLUTION

These deficiencies are eliminated and a technical advance is achieved consistent with the principles of the invention in an exemplary switching system in which telecommunications features are improved and extended by the use of proximity status information defining the presence or absence of a person to answer calls to a telephone station set, where the status information is transmitted to the switching system advantageously over the same telephone line used for the station set. Illustratively, the proximity status information simply defines the presence or absence of a person to answer calls to the station set without identifying a particular person.

A method in accordance with the invention is used in an arrangement comprising a telephone station set, a telephone switching system, access means, e.g., a telephone line, interconnecting the station set and the switching system, and a proximity detector. The proximity detector has a first state corresponding to the presence of a person to answer calls to the station set and a second state corresponding to the absence of a person to answer calls to the station set. The switching system receives information via the telephone line defining the state of the proximity detector. The switching system responds to incoming signaling requesting service by determining the state of the proximity detector based on the received information.

For a first exemplary feature of the invention, the incoming signaling defines a telephone call and that call is selectively extended to the station set based on the state of the proximity detector. The call is extended to the station set when the proximity detector is in the first state, i.e., a person is present to answer calls. The call is forwarded to another station set when the proximity detector is in the second state, i.e., no one is present to answer calls. Illustratively, the call is selectively extended or forwarded also based on the availability status of the station set to receive calls.

For a second exemplary feature of the invention, the incoming signaling defines a person status request from another telephone station set. The switching system first determines whether the other station set is entitled to receive information concerning the state of the proximity detector. Upon determining entitlement, the switching system transmits information defining the state of the proximity detector to the other station set. Illustratively, if the other station set remains off-hook after receiving the proximity state information, the switching system attempts to complete a telephone call between the two station sets.

For a third exemplary feature of the invention, the incoming signaling defines a telephone call and alerting is selectively effected at the station set based on the state of the proximity detector. For example, audible alerting is effected at the station set when the proximity detector is in the first state and silent alerting is effected at the station set when the proximity detector is in the second state. Silent alerting is effected at another station set when the proximity detector is in the first state and audible is effected at the other station set when the proximity detector is in the second state. This feature is effective to facilitate the efficient answering of calls, for example, to an executive having a primary secretary and a backup secretary.

For a fourth exemplary feature of the invention, the incoming signaling defines a telephone call and an automatic call distribution function is performed by selectively extending calls to station sets based on proximity detector state.

For a fifth exemplary feature of the invention, the incoming signaling defines an automatic callback request and the switching system attempts to complete a call between the station set and another station set when the proximity detector is in the first state. The proximity state determination is repeated at regular time intervals as long as the proximity detector is in the second state. Alternatively, rather than attempting to complete a call, the requesting party is simply notified when the proximity detector returns to the first state.

Apparatus in accordance with the invention is used in an arrangement comprising a telephone station set, a telephone switching system, and access means interconnecting the station set and the switching system. The apparatus comprises a proximity detector for detecting the presence and absence of a person within a predefined area. The proximity detector has first and second states and is for location with respect to the station set such that the first state corresponds to the presence of a person to answer calls to the station set and the second state corresponds to the absence of a person to answer calls to the station set. The apparatus further comprises means responsive to the proximity detector for transmitting state information of the proximity detector via the access means to the switching system.

An essential part of the invention is a device that responds to the presence of a person. Many such devices are marketed, for various purposes, such as intrusion detection and turning on lights or opening doors automatically. One type of device which is well suited, but is not the only choice, is one based on detection of infrared radiation from the human body. One example is a unit marketed by the RCA Company, intended to turn on lights in a home, either as a convenience for the residents, or to repel intruders. It is called the Plug-In Security Switch Model c-21. It is sold in retail hardware stores, and is manufactured by RCA New Products Division, New Holland Avenue, Lancaster, Pennsylvania, 17604-3140.

Another device, in a relatively small package (1.5×1.5×0.5 inches), intended to be built into other equipment, is the Digital Passive Infrared Sensing Module, model IR1000, manufactured by Infrared, Incorporated, P.O. Box 47, Parlin, N.J. 08859

DRAWING DESCRIPTION

FIG. 4 shows terminal related data stored in a control unit of the switching system of FIG. 1 defining call and user activity for a terminal of FIG. 1;

FIG. 6 through 10 are flowcharts showing how the switching system of FIG. 1 uses the terminal related data stored in the control unit to process calls based on user activity.

DETAILED DESCRIPTION

Figure 1:
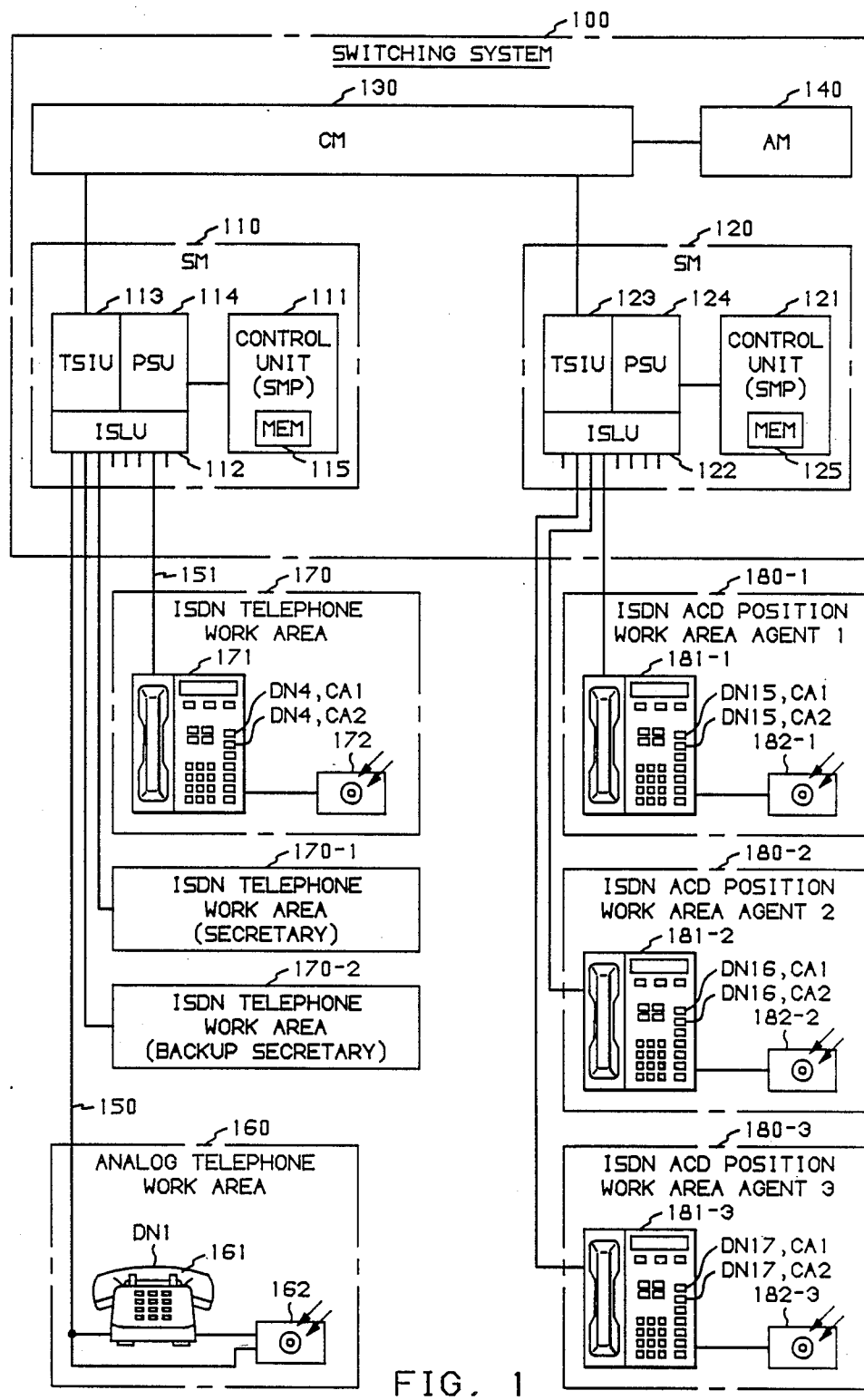
FIG. 1 is a diagram of a switching system serving a plurality of terminals.

Referring to FIG. 1, the principles of the invention are described in the context of a distributed control, integrated services digital network (ISDN) switching system 100. An integrated services digital network is defined as a network evolved from the telephony integrated digital network that provides end-to-end digital connectivity to support a wide range of services, including voice and non-voice services, to which users have access by a limited set of multipurpose customer interfaces. System 100 is connectable to analog or digital terminals such as analog terminal 161 and digital ISDN terminals 171, 181-1, 181-2 and 181-3 of FIG. 1. Each of the terminals 161, 171, 181-1, 181-2 and 181-3 is assigned a unique directory number illustratively DN1, DN4, DN15, DN16 and DN17. (Although not shown in FIG. 1, system 100 is also connectable via trunks to terminals associated with other switching systems.) System 100 includes a number of switching modules (SMs) each associated with a different subset of terminals. For example, switching module 110 is associated with terminals 161 and 171 and switching module 120 is associated with terminals 181-1, 181-2 and 181-3. Each such module includes a control unit, or switching module processor (SMP), for controlling connections to and from its associated subset of switch terminations. Module 110, for example, includes control unit 111, and module 120 includes control unit 121.

The architecture of system 100 comprises a communications module (CM) 130 as a hub for the switching modules 110 and 120, and an administrative module (AM) 140. Each switching module includes an integrated services line unit (ISLU) which terminates the digital and analog subscriber lines and provides access to a time-slot interchange unit (TSIU) and a packet switching unit (PSU). For example, in switching module 110, ISLU 112 terminates the digital and analog subscriber lines 151 and 150, and provides access to TSIU 113 and PSU 114, respectively, for circuit-switched and packet-switched connections to and from the associated terminals under the control of control unit 111. Switching module 120 similary includes ISLU 122, TSIU 123, and PSU 124.

Communications module 130 includes a time-shared, space-division switch or time-multiplexed switch, that provides 64 kilobits per second circuit-switched paths between switching modules. It supports B-channel and analog traffic between switching modules, as well as packet traffic between PSUs in different switching modules. The switching module control unit, such as 111, provides call processing and overall control and maintenance functions for the switching module. Control units, such as 111 and 121, in different switching modules communicate with each other and with the administrative module 140 through a message switch (not shown) in the communications module, using an internal message protocol. The architecture provides flexibility in placing specific processing functions in specific processing elements. The general strategy is to place much of the required processing capability in the switching module control units, but to reserve the administrative module for those functions that are inherently centralized. The call processing functions can for example be distributed in a number of ways. In one alternative, most of the call processing functions are placed in the switching module control units with routing, terminal hunting, and path hunt functions located in the administrative module. In another alternative, all call processing functions are placed in the switching module control units, with the administrative module reserved for truly administrative processing.

Each analog terminal, such as 161, communicates with system 100 via dual tone multi-frequency (DTMF) signals over a standard tip and ring wire loop, such as 150.

Each ISDN user terminal, such as 171, communicates with system 100 over a digital line, such as 151, which includes two 64 kilobits per second channels conventionally referred to as B-channels (not shown) and in one 16 kilobits per second channel conventionally referred to as a D-channel (not shown). In the present embodiment, one B-channel is used to convey digitized voice samples at the rate of 8000, eight-bit samples per second, and the other B-channel is used to convey data at a rate of 64 kilobits per second. (However, each B-channel could be used for either voice or data traffic.) The D-channel is used both to convey signaling packets to effect message signaling between ISDN terminals and system 100 and to convey data packets between different ISDN terminals.

Digital line 151 is a four-wire digital line using one pair of wires for each direction of transmission. Line 151 transmits a serial bit stream at the rate of 192 kilobits per second which comprises 144 kilobits per second for the above-mentioned two 64 kilobits per second B-channels and one 16 kilobits per second D-channel and which further comprises 48 kilobits per second used for a number of functions including framing, DC balancing, control and maintenance. Line 151 represents what is referred to by the International Telegraph and Telephone Consultative Committee (CCTT) as the T-interface. The use of the T-interface is only exemplary, however, as the invention is equally applicable to systems using other access methods.

Signaling packets are conveyed between an ISDN terminal and system 100 enclosed in level 2 (link-level) frames in accordance, for example, with the standard LAPD protocol. The exemplary signaling messages used for the control of circuit-switched voice calls are in accordance with CCITT recommendation Q.931.

Terminals 161, 171, 181-1, 181-2 and 181-3 are located in work areas 160, 170, 181-1, 181-2 and 180-3, respectively. These work areas can be an enclosed office or portion thereof, an enclosed laboratory or portion thereof, or a small work area within a large open work environment (e.g., factory). In this embodiment, the dimensions of the work areas are based on the effective range of a proximity detection device. Terminals 161, 171, 181-1, 181-2 and 181-3 are connected to proximity detection device circuitry 162, 172, 182-1, 182-2 and 182-3, respectively. When a person enters or leaves work area 160, associated with analog phone 161, proximity detection device circuitry 162 initiates a feature activation sequence using DTMF. When a person enters or leaves a work area 170, 180-1, 180-2 or 180-3 associated with ISDN terminals 171, 181-1, 181-2 or 181-3, proximity detection device circuitry 172, 182-1, 182-2 or 182-3, respectively, trigger a special Q.931 message. Work areas 170-1 and 170-2 also each include an ISDN terminal (not shown) and associated proximity detection device circuitry (not shown).

Figure 2:
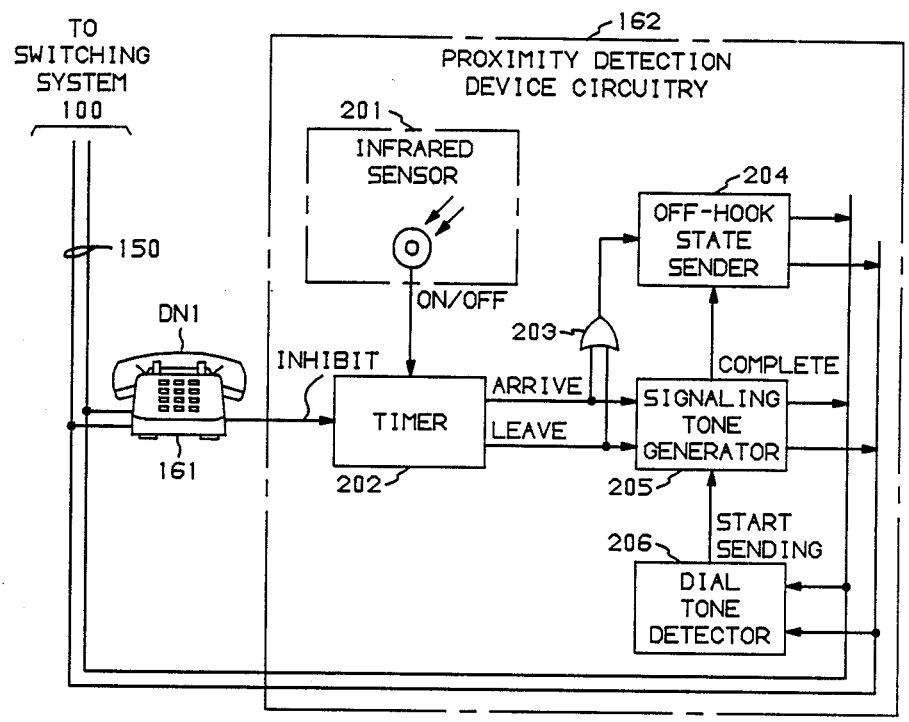
FIG. 2 is a more detailed diagram of an analog work area of FIG. 1.

The exemplary proximity detection device circuitry 162 for analog work area 160 is shown in FIG. 2. It illustratively includes infrared sensor 201, timer 202, OR gate 203, off-hook state sender 204, and tone generator 205 and dial tone detector 206. When a person enters area 160, sensor 201 detects that condition and responds by switching to its "on" state. Sensor 201 remains "on" as long as a person is in work area 160. When a person is absent or leaves area 160, sensor 201 switches to its "off" state. Commercially available infrared sensors may depend not only on the person's body heat, but also on some amount of motion, so there may be times when the infrared sensor will momentarily switch to the "off" state even though the person is present. There will also be times when the assigned person is absent, but another person enters the work area for a short time, to leave a note, for example. To avoid inappropriate action when someone enters or leaves the work area only temporarily, sensor 201 is followed by a timing circuit 202 that requires the on and off states of the infrared sensor to persist for predetermined periods before the timing circuit delivers output signals that report that the person has validly arrived or left for purposes of this service. The "arrive" and "leave" signals from timer 202 illustratively are short "logic level" pulses appropriate to drive standard logic circuits (not shown) in the signaling tone generator 205 and "OR" gate 203. When either an "arrive" or "leave" signal reaches OR gate 203, it activates the off-hook state sender 204 which enters a latched state to signal to the switching system 100 over line 150 that a service connection is desired. System 100 responds, as it does for any request for a connection, by sending dial tone.

The dial tone, which is normally an audible signal to a person to dial digits, is in this case detected by dial tone detector 206 which then sends a logic "start" signal to tone generator 205. The latter, in turn, sends one of two digit sequences to system 100 for identifying the presence or absence of a person in work area 160.

The digit sequences are illustratively encoded into a dual-tone, multifrequency format, which is the same format used to transmit digits dialed by a telephone user when dialing a telephone number or activating a feature from the key pad on telephone set 161. Although in the majority of cases, the digits are sent using standard dual-tone, multi-frequency (DTMF) encoding, the "arrive" and "leave" signals could also be sent to system 100 using out-of-band tones. After the digit sequence has been sent by generator 205, a "complete" signal is sent to the circuit 204 to restore it to the on-hook state. To avoid possible interference with calls while the person is actually present and using set 161, a switchhook control signal is derived from set 161 and delivered to the timing circuit 202 to inhibit any output from that circuit while set 161 is off-hook. The inhibit control signal is based on the flow of "office battery" direct current through the line 150 when the analog telephone set is off-hook. This inhibit control signal prevents call interference that might otherwise occur if a person returned to her/his office and made a call immediately, before the pre-set time elapses and the "arrive" signal is sent. Timer 202 is configured so that the "arrive" signal is subsequently allowed to be sent when set 161 is returned to the on-hook state.

Figure 3:
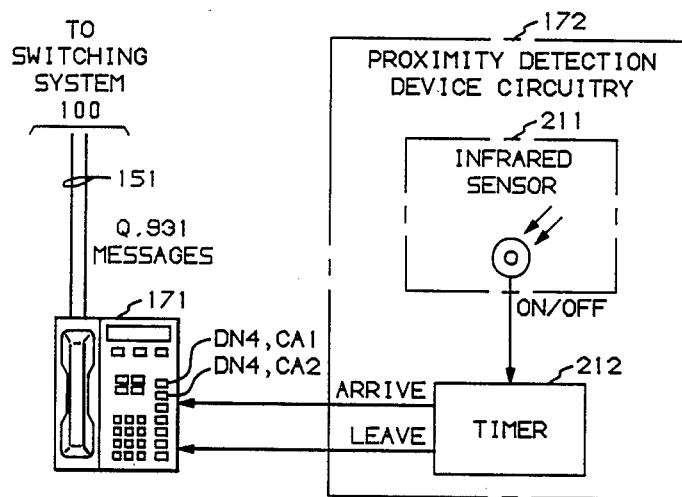
FIG. 3 is a more detailed diagram of an ISDN work area of FIG. 1.

FIG. 3 depicts the exemplary proximity detection device circuitry 172 for ISDN work area 170, including an infrared sensor 211, and a timer 212. When a person enters or leaves the work area 170, that event is detected by sensor 211. However, because of the fact that with an ISDN telephone set control messages can be sent via the D channel to system 100 at any time, independent of whether telephone set 171 is off hook, the operation of the circuitry 172 is substantially simpler than that of circuitry 162. When timer 212 times for a predetermined period, it determines at the expiration thereof that a person has been consistently present or absent long enough for the sending of an "arrive" or "leave" signal, it sends one or the other to the ISDN set 171. ISDN set 171 translates each of the signals into a distinct digital message and transmits it to system 100 via line 151. The off-hook inhibit control signal used in analog telephone work area 160 is not needed because the ISDN telephone set can send digital messages on line 151 at any time, regardless of whether the set is in use or not.

System 100 responds to the arrive and leave messages from either an ISDN or analog line 151 or 150 by toggling back and forth a memory element in a memory 115 in the control unit 111 of FIG. 1 between two states that represent "person absent" and "person present". These two states are used to activate and deactivate other functions, such as call forwarding, work position unavailable, or person available for visit. A memory 125 in control unit 121 of FIG. 1 functions essentially the same as memory 115.

The processing of calls to and from terminals that are in work areas 160, 170, 170-1, 170-2, 180-1, 180-2 and 180-3 are controlled by units 111 and 121 of FIG. 1. For example, unit 111 processes calls for terminals 161 and 171. The dynamic busy/idle status and the dynamic proximity status are stored in memory 115 as depicted in FIG. 4. The real time busy/idle status is maintained in memory 115 for each directory number (illustratively DN1-DN8) or equipment location that is connected to SM 110. The real time proximity status is stored in memory 115 for the primary user of a directory number when the user's terminal equipment is connected to a proximity sensor device. Proximity status is set in memory 115 to one of four values: in work area, out of work area, private, or unknown. For those users that do not employ a proximity sensor device, the proximity status field is set to "null". The proximity status is updated under four conditions: (1) a person enters the work area, (2) a person leaves the work area, (3) a person requests proximity privacy, or (4) an abnormal event occurs (e.g., the line is taken out of service) such that the proximity status is unknown.

Figure 5:
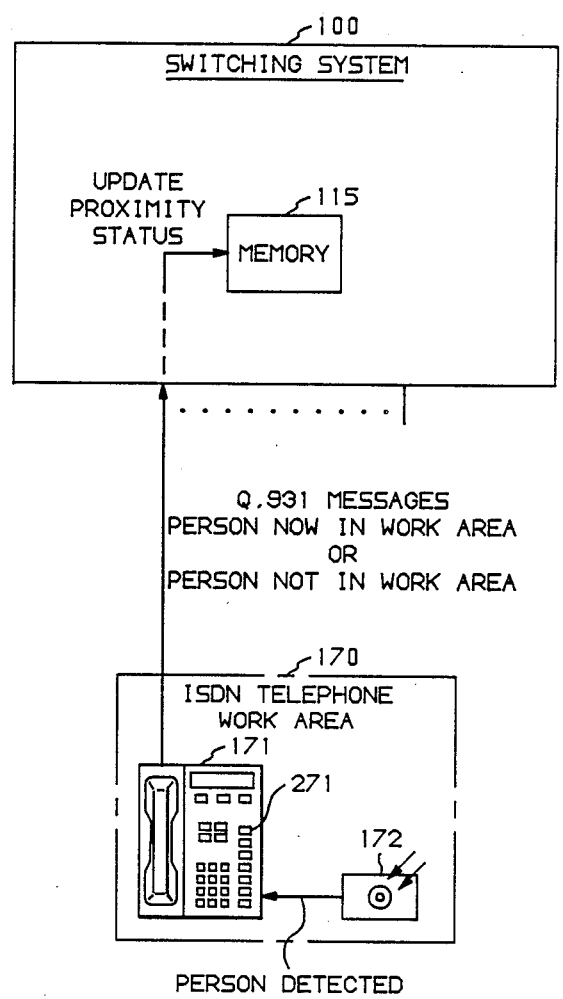
FIG. 5 is a diagram showing user activity, message flows, and updates to terminal related data in the control unit of the switching system of FIG. 1.

In FIG. 5, when a person enters the ISDN work area 171, sensor circuitry 172 detects the presence of a person. After a pre-set time interval, circuitry 172 signals terminal 171 that a person has been detected. Terminal 171 then sends a Q.931 message to system 100 indicating that a person is now in the work area. In response thereto, control unit 111 updates memory 115—setting the dynamic proximity status field for DN4 to "in work area" as shown in FIG. 4.

Similarly, in FIG. 5, when a person leaves the ISDN work area 170, the sensor circuitry 172 detects the absence of a person. After a pre-set time interval, circuitry 172 signals terminal 171 that a person has vacated the work area. Terminal 171 then sends a Q.931 message to switching system 100 indicating that the person is no longer in the work area. In response thereto, control unit 111 updates memory 115—setting the dynamic proximity status for DN4 to "out of work area" as shown in FIG. 4.

Under certain conditions, the user may not want their proximity status to be stored in the switch. To accomplish this, the user can depress a feature button 271 on terminal 171, which results in a Q.931 message indicating that the button has been depressed. System 100 translates that message as "proximity privacy requested," and updates memory 115—setting the dynamic proximity status for DN4 to "private."

Control unit 111 recognizes certain error conditions in which the dynamic proximity status is not determined or guaranteed to be accurate. Under these error conditions, unit 111 updates memory 115—setting the dynamic proximity status for DN4 to "unknown." Examples of such error conditions are: (1) telephone set out of service due to software action or maintenance, or administrative action by people responsible for switching system; (2) telephone set disconnected by user (the switch monitors the status of all ISDN lines); and (3) a unique message sent from the telephone set to the switching system to state that the proximity detector is inoperative.

Maintaining dynamic proximity status in memory 115 allows switching system 100 to provide enhanced call processing capabilities. For example, calls can be redirected to other stations depending on whether or not a person is within the proximity of the phone for a prescribed time period. The application of proximity status to telephone call processing is further explained in the following description which is arranged in five parts. First, the call processing logic for an improved call forwarding feature is described. Second, the call processing logic is described for a call processing capability enabling a person to query the switch via a person status request about the proximity status of another person. Third, the call processing logic for an improved ring transfer feature is described. Fourth, the call processing logic for an improved automatic call distribution feature is disclosed. Finally, the call processing logic for an improved automatic callback feature is described.

Figure 6:
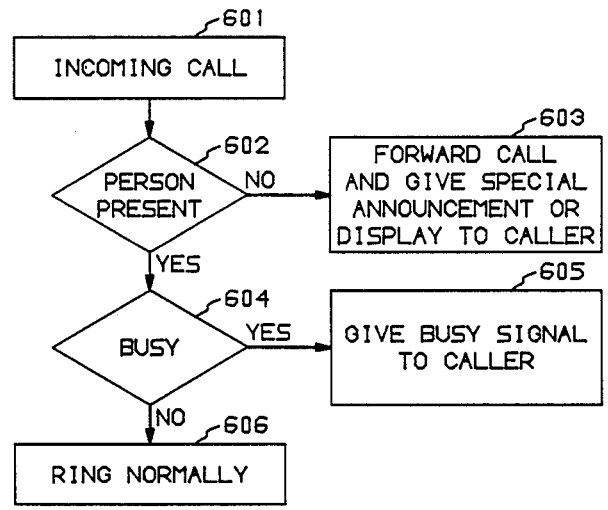

A flow chart for a call processing program used to provide an improved call forwarding feature is shown in FIG. 6. The execution of the program begins with block 601 when control unit 111 receives a request to terminate an incoming call to directory number DN4. Execution proceeds to block 602 where unit 111 determines whether the primary user of DN4 is present in his/her work area. Unit 111 reads the dynamic proximity status field of memory 115 and if the proximity status is set to "out of work area" or "private," execution proceeds to block 603. Block 603 is executed and the call is forwarded to another directory number DN (e.g., DN6) which had been previously stored in memory 115. Control unit 111 effects the call forwarding by reading from memory 115 the number to which the call is to be forwarded and then controlling the call forward establishment of call connections to the station associated with that number while concurrently sending a special announcement or providing a display to the caller of the number to which the call is forwarded.

If during the execution of block 602, unit 111 determines that the dynamic proximity status is "in work area" or "unknown," execution will proceed to block 604 with unit 111 examining the busy/idle data in memory 115 (FIG. 4). If the busy/idle status is set to busy for analog lines, or all CAs (call appearances) are busy for ISDN lines, the station set is not available to receive calls and execution proceeds to block 605 where control unit 111 returns a busy signal to the caller. If the busy/idle status is idle for analog lines, or at least one CA is idle for ISDN lines, the station set is available to receive calls and execution proceeds to block 606 and the called DN will be rung, or alerted, normally.

Figure 7:
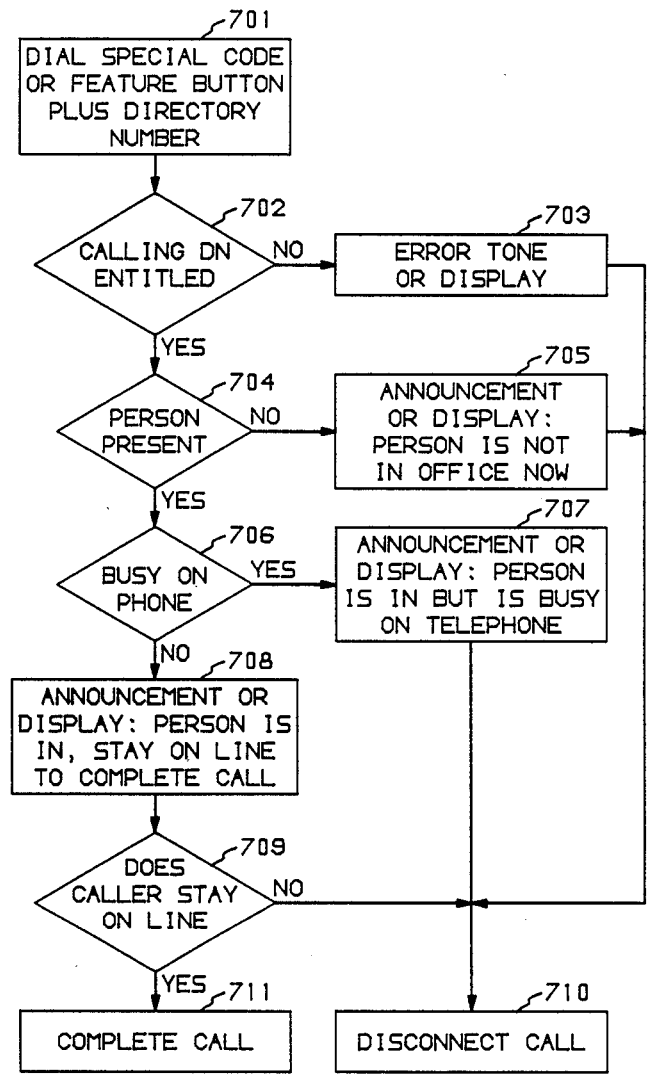

A flow chart for a call processing program used to provide a new proximity query feature is shown in FIG. 7. Execution begins in block 701 when control unit 111 receives a person status request comprising a unique dialed entitlement code plus a dialed DN (e.g., *58+DN4) from an analog terminal, or unit 111 receives a person status request comprising a unique feature button entitlement indication and a dialed DN within a Q.931 message (e.g., button number 18+DN4) from an ISDN terminal. Unit 111 translates the dial code or feature button indication into a proximity query feature request, and performs an entitlement check in block 702.

Due to the sensitive nature of proximity information, an entitlement check is made. This ensures that proximity information is only sent to a prespecified set of querying telephone numbers. Memory 115 (FIG. 4) shows the list of telephone numbers that are allowed to query about a given person's proximity. For example, the owner of DN1 only allows callers from DN3 and DN4 to query about his/her proximity status. The owner of DN2 allows all callers from DN1 through DN50 to query. DN3 denies all users from proximity queries. Since any caller using an entitled telephone number can make a query, a password may be used to validate the entitlement, as is shown with DN4.

If the entitlement check of block 702 reveals no entitlement, an error tone or message is sent to the caller per block 703. If there is entitlement, call processing proceeds to block 704 where the control unit determines the dynamic proximity status. If the proximity status is set to "out of work area," execution proceeds to block 705, and the control unit transmits an announcement or display message to the calling station set indicating that the person is not in the office. A similar procedure (not shown in FIG. 7) with an appropriate announcement/message is provided if the dynamic status is "private" or "unknown."

If during the execution of block 704, the control unit determines that the dynamic proximity status is "in work area," execution proceeds to block 706. Control unit 111 then examines the busy/idle status in memory 115 for the dialed DN (i.e., DN4). If the busy/idle status is busy (for analog lines) or at least one CA is busy for ISDN lines, execution proceeds to block 707, and the control unit transmits an announcement or display message to the calling station set indicating that the person is in the office but is on the telephone. If the busy/idle status is set to idle (for analog lines) or all CAs are idle for ISDN lines, execution proceeds to block 708, and the control unit transmits an announcement or display message indicating that the person is in the office and requesting the calling party to stay on the line to complete a call. Execution proceeds to block 709 where a branch is effected to either block 710 or block 711 depending on whether the caller stays on the line. If the caller stays on the line, the call is completed in block 711. If the caller does not stay on the line, the call is disconnected in block 710.

Figure 8:
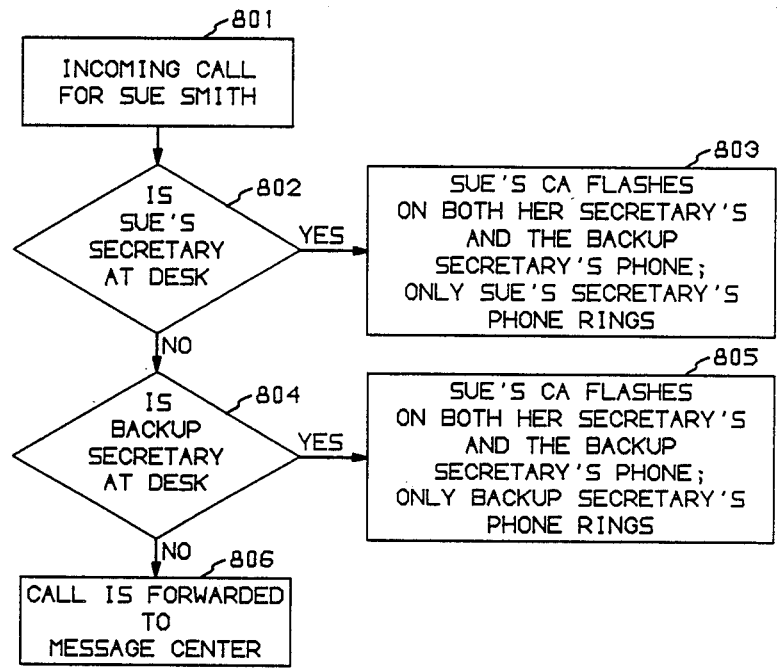

A flow chart for a call processing program used to provide an improved ring transfer feature is shown in FIG. 8. The execution of the program begins with block 801 when control unit 111 receives a request to terminate an incoming call to DN4 (Sue Smith) at work area 170. (Since a key-system arrangement with shared call appearances (CAs) such as that disclosed in U.S. Pat. No. 4,791,662, D. J. Ahnen et al., December 13, 1988, is used, Sue's CAs (i.e., DN4 CA1 and DN4 CA2) appear on her secretary's phone at work area 170-1. Sue's CAs also appear on a backup secretary's phone at work area 170-2.) Execution proceeds to block 802 where the control unit determines whether Sue Smith's secretary is present in his/her work area. The control unit reads the dynamic proximity status field and if the proximity status is set to "in work area," execution proceeds to block 803 where Sue's secretary's phone rings, and Sue's CA on the backup secretary's phone silently flashes.

If during the execution of block 802, the control unit determines that the proximity status is "out of work area" or "unknown," execution proceeds to block 804. The control unit then reads the dynamic proximity status for the backup secretary, and if the status is "in work area" execution proceeds to block 805 where the backup secretary's phone rings, and Sue's CA on her secretary's phone silently flashes.

If during the execution of block 804, the control unit determines that the proximity status is "out of work area" or "unknown," execution proceeds to block 806, and the call is forwarded to a message center. The proximity status of "private" is not supported for this feature.

Figure 9:
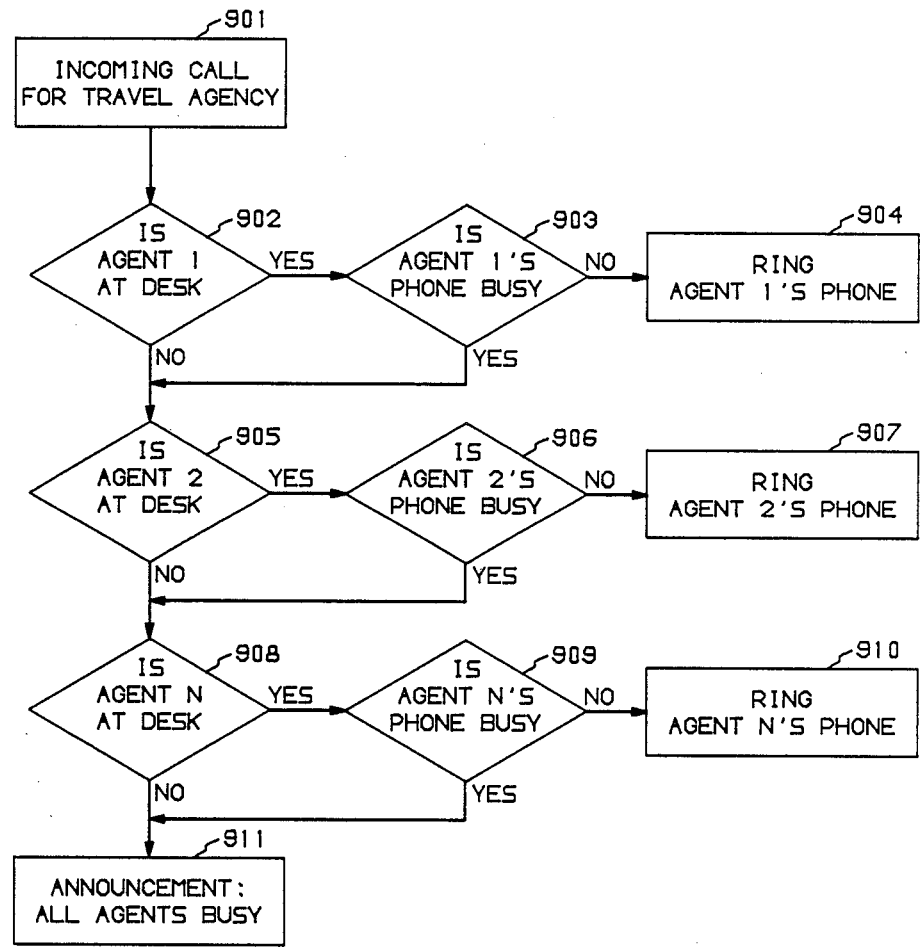

A flow chart for a call processing program used to provide an improved automatic call distribution (ACD) feature is shown in FIG. 9. In this exemplary embodiment a series completion distribution technique is used to distribute calls to the agents. More sophisticated techniques are available that distribute calls more evenly to groups of agents. The execution of the program begins with block 901 when control unit 121 receives a request to terminate an incoming call to the main DN of a business using an ACD (e.g., travel agency). Calls to the main DN are distributed to one of many agents (i.e., agents 1, 2, 3, ... N). A group of three ISDN ACD positions are shown as work areas 180-1, 180-2 and 180-3 in FIG. 1. Execution proceeds to block 902 where the control unit determines whether the first agent in the ACD is present in his/her work area.

If during the execution of block 902, the control unit determines that the dynamic proximity status is "in work area," execution proceeds to block 903. Control unit 121 then examines the busy/idle data in memory 125. If the busy/idle status is set to busy for analog lines, or all CAs are busy for ISDN lines, execution proceeds to block 905. If the busy/idle status is idle for analog lines, or at least one CA is idle for ISDN lines, execution will proceed to block 904 and Agent 1's phone will ring.

If during the execution of block 902, the control unit determines that the dynamic proximity status is set to "out of work area" or "unknown," execution proceeds to block 905.

Starting in block 905 the procedures repeat as the control unit determines whether Agent 2 is available to receive a phone call. The execution proceeds to block 906 then 907, to block 906 then 908, or directly to block 908. The procedures then repeat through as many agents as necessary to complete the call; or if none of the agents are available, the execution proceeds to block 911, where the control unit transmits an announcement or display message indicating that all agents are unavailable.

A flow chart for a call processing program used to provide an improved auto-callback feature is shown in FIG. 10. The execution begins when one person (Joe) attempts to reach another person (Sally) and fails. In this embodiment blocks 1001 and 1002 depict Joe's failed attempt to reach Sally because Sally is away from her work area. In block 1003 control unit 111 receives an automatic callback request comprising a dial code (e.g., *64) or feature button indication within a Q.931 message (e.g., button number 19). The control unit translates the dial code or feature button indication to a "notification of availability" feature request. An entitlement check (not shown in FIG. 10) is used to ensure that the calling telephone number is entitled to use the improved auto-callback feature. The procedures used are the same as those used for the proximity query feature described earlier. Execution then proceeds to block 1004 where the control unit determines the dynamic proximity status. If the proximity status is set to "out of work area," "private," or "unknown," execution proceeds to block 1009.

If during the execution of block 1004, the control unit determines that the dynamic proximity status is "in work area," execution proceeds to block 1005. Control unit 111 then examines the busy/idle status in memory 115 for Sally's DN. If the busy/idle status is busy (for analog lines) or at least one CA is busy for ISDN lines, execution proceeds to block 1009. If the busy/idle status is set to idle (for analog lines) or all CAs are idle for ISDN lines, execution proceeds to block 1006 where the control unit determines the dynamic proximity status of Joe. If the proximity status is set to "out of work area," "private," or "unknown," execution proceeds to block 1009.

If during the execution of block 1006, the control unit determines that the dynamic proximity status is "in work area," execution proceeds to block 1007. Control unit 111 then examines the busy/idle status in memory 115 for Joe's DN. If the busy/idle status is busy (for analog lines) or at least one CA is busy for ISDN lines, execution proceeds to block 1009. If the busy/idle status is set to idle (for analog lines) or all CAs are idle for ISDN lines, execution proceeds to block 1008. In block 1008, the control unit rings Joe's phone. After Joe answers, the control unit sets up a call between Joe and Sally and rings Sally's phone.

If the execution proceeded to 1009 in any of the cases above, the control unit will wait "N" seconds. (N is set by the administrator of switching system 100 and is approximately 15 to 30 seconds.) Execution then proceeds back to block 1004 and the procedures are repeated. Alternatively, upon a positive determination in block 1004, the control unit may simply effect transmission of information to Joe defining that a person is present to receive calls to Sally's station set. Or upon a negative determination in block 1005, the control unit may effect transmission of information to Joe defining both that a person is present to receive calls to Sally's station set and that the person is not busy on another call.

It is to be understood that the above-described embodiments are merely illustrative of the principles of the invention and that other arrangements may be devised by those skilled in the art without departing from the spirit and scope of the invention. For example, although the proximity status information is stored in switching system 100 in the present embodiment, such information may alternatively either be stored by or in association with the station sets or determined dynamically in response to a proximity status request from switching system 100.

We claim:

1. A method for use in an arrangement comprising a telephone station set, a telephone switching system, access means interconnecting said station set and said switching system, and proximity detector means associated with said station set, said proximity detector means having a first state corresponding to the presence of a person to answer calls to said station set and having a second state corresponding to the absence of a person to answer calls to said station set, said method comprising said switching system receiving via said access means information defining the state of said proximity detector means and in response to incoming signaling requesting service, said switching system determining the state of said proximity detector means based on said received information.

2. A method in accordance with claim 1 wherein said incoming signaling defines a telephone call, said method further comprising said switching system selectively extending said telephone call to said station set based on said determined state of said proximity detector means.

3. A method in accordance with claim 2 wherein said extending comprises extending said telephone call to said station set when said determined state is said first state and wherein said method further comprises forwarding said telephone call to another telephone station set when said determined state is said second state.

4. A method in accordance with claim 2 further comprising determining the availability status of said station set to receive calls, and wherein said extending comprises selectively extending said telephone call to said station set based on said determined state of said proximity detector means and said determined availability status of said station set.

5. A method in accordance with claim 1 wherein said incoming signaling defines a telephone call, said method further comprising said switching system selectively effecting alerting at said station set based on said determined state of said proximity detector means.

6. A method in accordance with claim 5 wherein said effecting comprises effecting audible alerting at said station set when said determined state is said first state and wherein said method further comprises effecting audible alerting at another telephone station set when said determined state is said second state.

7. A method in accordance with claim 5 wherein said effecting comprises effecting audible alerting at said station set when said determined state is said first state and effecting silent alerting at said station set when said determined state is said second state and wherein said method further comprises effecting silent alerting at another telephone station set when said determined state is said first state and effecting audible alerting at said another station set when said determined state is said second state.

8. A method in accordance with claim 1 wherein said incoming signaling defines a person status request from another telephone station set, said method further comprising said switching system transmitting information defining said determined state of said proximity detector means to said another station set.

9. A method in accordance with claim 8 further comprising after said transmitting, said switching system attempting to complete a telephone call between said another station set and said first-mentioned station set.

10. A method in accordance with claim 9 wherein said attempting is in response to a request from said another station set.

11. A method in accordance with claim 10 wherein said request comprises a continued off-hook state of said another station set.

12. A method in accordance with claim 1 wherein said incoming signaling defines a person status request from another telephone station set, said method further comprising
said switching system determining whether said another station set is entitled to receive information concerning the state of said proximity detector means and
upon determining that said another station set is entitled to receive information concerning the state of said proximity detector means, said switching system transmitting information defining said determined state of said proximity detector means to said another station set.

13. A method in accordance with claim 1 wherein said incoming signaling defines an automatic callback request from another telephone station set, said method further comprising
said switching system attempting to complete a telephone call between said first-mentioned station set and said another station set when said determined state is said first state and
said switching system repeating said determining when said determined state is said second state.

14. A method in accordance with claim 13 further comprising
performing an automatic callback service entitlement check prior to said attempting.

15. A method in accordance with claim 13 wherein said attempting comprises
determining whether there is an active call at said first-mentioned station set,
upon determining that there is no active call at said first-mentioned station set, effecting alerting at said first-mentioned station set and
in response to receipt of answer signaling from said first-mentioned station set, attempting to complete said telephone call between said first-mentioned station set and said another station set.

16. A method in accordance with claim 1 further comprising
repeating said determining until the determined state of said proximity detector means is said first state and
upon a determination that the state of said proximity detector means is said first state, transmitting information to another telephone station set defining that a person is present to receive calls to said first-mentioned station set.

17. A method in accordance with claim 1 further comprising
repeating said determining until the determined state of said proximity detector means is said first state,
upon a determination that the state of said proximity detector means is said first state, determining whether there is an active call at said station set,
repeating said last-mentioned determining until it is determined that there is no active call at said station set and
upon a determination that there is no active call at said station set, transmitting information to another telephone station set defining that a person is present to receive calls to said first-mentioned station set and that there is no active call at said first-mentioned station set.

18. A method in accordance with claim 1 wherein said switching system further comprises memory means, said method further comprising
storing in said memory means state information defining the state of said proximity detector means and updating said stored state information based on said received information.

19. A method in accordance with claim 18 wherein said determining comprises
reading said updated state information from said memory means.

20. A method in accordance with claim 1 wherein said determining comprises
said switching system transmitting a request over said access means, and wherein
said information is received after said request is transmitted.

21. A method for distributing telephone calls to a plurality of telephone stations sets each having an associated proximity detector means having a first state corresponding to the presence of a person to answer calls to the associated station set and a second state corresponding to the absence of a person to answer calls to the associated station set, said method comprising
in response to a call, determining the state of the proximity detector means associated with a first one of said station sets,
extending said call to said first station set when said determined state of said proximity detector means associated with said first station set is said first state, and
determining the state of the proximity detector means associated with a second one of said station sets when said determined state of said proximity detector means associated with said first station set is said second state.

22. A method in accordance with claim 21 further comprising
extending said call to said second station set when said determined state of said proximity detector means associated with said second station set is said first state.

23. A method in accordance with claim 21 further comprising
determining whether said first station set is available to receive calls,
said extending being in response to determining that said first station set is available to receive calls.

24. A method in accordance with claim 21 for use in an arrangement comprising a telephone switching system, first access means interconnecting said first station set and said switching system, and second access means interconnecting said second station set and said switching system, said method further comprising
said switching system receiving via said first access means information defining the state of said proximity detector means associated with said first station set and
said switching system receiving via said second access means information defining the state of said proximity detector means associated with said second station set.

25. A method for effecting alerting at a plurality of telephone station sets each having an associated proximity detector means having a first state corresponding to the presence of a person to answer calls to the associated station set and a second state corresponding to the absence of a person to answer calls to the associated station set, said method comprising in response to a call, determining the state of the proximity detector means associated with a first one of said station sets, effecting audible alerting at said first station set when said determined state of said proximity detector means associated with said first station set is said first state and determining the state of the proximity detector means associated with a second one of said station sets when said determined state of said proximity detector means associated with said first station set is said second state.

26. A method in accordance with claim 25 further comprising effecting audible alerting at said second station set when said determined state of said proximity detector means associated with said second station set is said first state.

27. A method in accordance with claim 26 further comprising effecting silent alerting at said second station set when said determined state of said proximity detector means associated with said first station set is said first state and effecting silent alerting at said first station set when said determined state of said proximity detector means associated with said second station set is said first state.

28. A method in accordance with claim 25 further comprising transferring said call to a message center when said determined state of said proximity detector means associated with said second station set is said second state.

29. A method in accordance with claim 25 for use in an arrangement comprising a telephone switching system, first access means interconnecting said first station set and said switching system, and second access means interconnecting said second station set and said switching system, said method further comprising said switching system receiving via said first access means information defining the state of said proximity detector means associated with said first station set and said switching system receiving via said second access means information defining the state of said proximity detector means associated with said second station set.

30. A method for use in an arrangement comprising a telephone switching system and a plurality of telephone station sets each having an associated proximity detector means having a first state corresponding to the presence of a person to answer calls to the associated station set and a second state corresponding to the absence of a person to answer calls to the associated station set, said method comprising said switching system determining the state of the proximity detector means associated with a first one of said station sets and the availability status of said first station set, said switching system determining the state of the proximity detector means associated with a second one of said station sets and the availability status of said second station set and upon determining that the state of said proximity detector associated with said first station set is said first state, that the state of said proximity detector associated with said second station set is said first state, and that said first and second stations sets are both available for receiving calls, said switching system attempting to complete a telephone call between said first and second station sets.

31. A method in accordance with claim 30 wherein said method is performed in response to an automatic callback request from one of said first and second station sets.

32. A method in accordance with claim 30 further comprising repeating both of said determining steps at regular time intervals until completion of said telephone call is attempted.

33. A method in accordance with claim 30 wherein said arrangement further comprises first access means interconnecting said first station set and said switching system, and second access means interconnecting said second station set and said switching system, said method further comprising said switching system receiving via said first access means information defining the state of said proximity detector means associated with said first station set and said switching system receiving via said second access means information defining the state of said proximity detector means associated with said second station set.

34. A method for use in an arrangement comprising a telephone station set, a telephone switching system, access means interconnecting said station set and said switching system, and proximity detector means associated with said station set, said proximity detector means having a first state corresponding to the presence of a person within a predefined area and having a second state corresponding to the absence of a person within said predefined area, said method comprising said switching system receiving via said access means information defining the state of said proximity detector means and in response to incoming signaling requesting service. said switching system determining the state of said proximity detector means based on said received information.

35. A method in accordance with claim 34 wherein said incoming signaling defines a person status request from another telephone station set, said method further comprising said switching system transmitting information defining said determined state of said proximity detector means to said another station set.

36. A method in accordance with claim 34 further comprising repeating said determining until the determined state of said proximity detector means is said first state and upon a determination that the state of said proximity detector means is said first state, transmitting information to another telephone station set defining said first state of said proximity detector means.

37. An arrangement comprising a telephone station set, a telephone switching system, access means interconnecting said station set and said switching system and proximity detector means associated with said station set, said proximity detector means having a first state corresponding to the presence of a person to answer calls to said station set and having a second state corresponding to the absence of a person to answer calls to said station set, said switching system comprising means for receiving via said access means information defining the state of said proximity detector means and means responsive to incoming signaling requesting service for determining the state of said proximity detector means based on said received information.

38. An arrangement in accordance with claim 37 wherein said switching system further comprises memory means for storing state information defining the state of said proximity detector means and means for updating the state information stored in said memory means based on said received information.

39. An arrangement in accordance with claim 38 wherein said determining means comprises means for reading said updated state information from said memory means.

40. An arrangement in accordance with claim 37 wherein said access means comprises an analog telephone line, said station set is an analog set, and said arrangement further comprises means for interfacing said analog telephone line, said analog station set, and said proximity detector means to transmit proximity information to said switching system.

41. An arrangement in accordance with claim 37 wherein said access means comprises an ISDN digital subscriber line, said station set is an ISDN set, and said arrangement further comprises means for interfacing said ISDN digital subscriber line, said ISDN station set, and said proximity detector means to transmit proximity information to said switching system.

42. A telephone switching system for use with a telephone station set, access means interconnecting said station set and said switching system, and proximity detector means associated with said station set, said proximity detector means having a first state corresponding to the presence of a person to answer calls to said station set and having a second state corresponding to the absence of a person to answer calls to said station set, said switching system comprising means for receiving via said access means information defining the state of said proximity detector means and means cooperative with said receiving means and responsive to incoming signaling requesting service for determining the state of said proximity detector means based on said received information.

43. Apparatus for use with an arrangement comprising a telephone station set, a telephone switching system, and access means interconnecting said station set and said switching system, said apparatus comprising proximity detector means for detecting the presence and absence of a person within a predefined area, said proximity detector means having first and second states and being for location with respect to said station set such that said first state corresponds to the presence of a person to answer calls to said station set and said second state corresponds to the absence of a person to answer calls to said station set and means responsive to said proximity detector means for transmitting state information of said proximity detector means via said access means to said switching system.

44. Apparatus in accordance with claim 43 wherein said transmitting means comprises means responsive to a state change of said proximity detector means for transmitting information relating to said state change via said access means to said switching system.

45. Apparatus in accordance with claim 43 wherein said transmitting means comprises means responsive to a state change of said proximity detector means of at least a predefined duration for transmitting an off-hook signal via said access means to said switching system and means responsive to a dial tone signal on said access means for transmitting one of two signals via said access means to said switching system dependent on said state change of said proximity detector means.

46. Apparatus in accordance with claim 43 wherein said station set is a digital station set, said access means comprises a digital subscriber line having at least a B-channel and a D-channel and said transmitting means comprises means responsive to a state change of said proximity detector means of at least a predefined duration for transmitting one of two signals via said D-channel to said switching system dependent on said state change of said proximity detector means.

47. Apparatus in accordance with claim 43 further comprising means for connection with said station set for inhibiting said transmitting means when said station set is off-hook.

* * * * *